United States Patent [19]

Kaplan et al.

[11] Patent Number: 4,950,199
[45] Date of Patent: Aug. 21, 1990

[54] MECHANICAL PUSH-TOY

[75] Inventors: Andrew J. Kaplan, Portsmouth, N.H.; Edward B. Seldin, Cambridge, Mass.

[73] Assignee: Kinderworks Corporation, Portsmouth, N.H.

[21] Appl. No.: 443,489

[22] Filed: Nov. 28, 1989

[51] Int. Cl.⁵ .......................... A63H 1/00; A63H 5/00
[52] U.S. Cl. ................... 446/238; 446/419; 446/266; 280/1.23; 74/69
[58] Field of Search .............. 446/238, 237, 236, 243, 446/244, 265, 266, 269, 270, 272, 279, 280, 287, 288, 419, 418, 421; 74/69, 68, 64; 280/1.22, 1.23, 22.1

[56] References Cited

U.S. PATENT DOCUMENTS

| 184,889 | 11/1876 | Nangel et al. | 446/238 |
| 1,120,470 | 12/1914 | Fox | 446/238 |
| 1,396,109 | 11/1921 | Grimsley | 446/238 |
| 2,370,532 | 2/1945 | Gerlache | 446/238 |
| 2,440,747 | 5/1948 | Higley | 446/238 |
| 2,485,895 | 10/1949 | Kost | 74/69 X |
| 3,187,461 | 6/1965 | Vicini | 446/238 |
| 4,083,143 | 4/1978 | Allen | 446/280 |
| 4,787,635 | 11/1988 | Mynatt, Jr. | 446/418 X |

FOREIGN PATENT DOCUMENTS 14886 of 1893 United Kingdom ............... 446/238

Primary Examiner—Robert A. Hafer
Assistant Examiner—D. Neal Muir
Attorney, Agent, or Firm—Reed Smith Shaw & McClay

[57] ABSTRACT

The present invention relates to a novel push toy that includes a handle having a main shaft connected to an axle which includes at least two substantially circular members rotatably fitted thereon. The substantially circular members are rotatably engaged with each other such that when the push-toy is pushed or pulled across a surface, the substantially circular member engaging the surface rotates, thereby rotating the other substantially circular member which is not engaged with the surface.

13 Claims, 2 Drawing Sheets

MECHANICAL PUSH-TOY

FIELD OF THE INVENTION

The present invention relates to an apparatus, specifically a mechanical push-toy for children.

SUMMARY OF THE INVENTION

The push-toy of the present invention includes a handle having a main shaft connected to an axle which includes at least two substantially circular members rotatably fitted thereon. The substantially circular members are rotatably engaged with each other such that when the push-toy is pushed or pulled across a surface, the substantially circular member engaging the surface rotates thereby rotating the other substantially circular member which is not engaged with the surface.

Other details, objects and advantages of the invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

Figure 1:
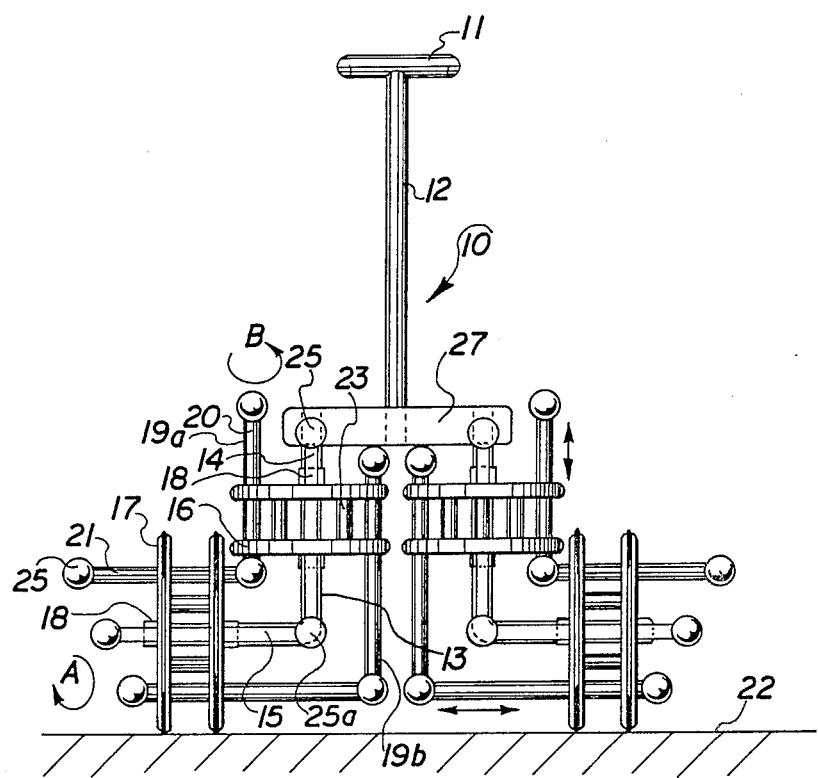
FIG. 1 represents an elevation view of a preferred embodiment of the present invention.

As illustrated in FIG. 1, the present invention includes a push-toy generally 10, having a handle 11 connected to a main shaft 12. The handle 11 is sized and shaped to fit comfortably in the palm of a human hand, especially that of a small child.

The main shaft 12 in turn is preferably connected to a collar member 27. This collar member 27 connects the main shaft 12 to at least one angular axle member 13.

Figure 2:
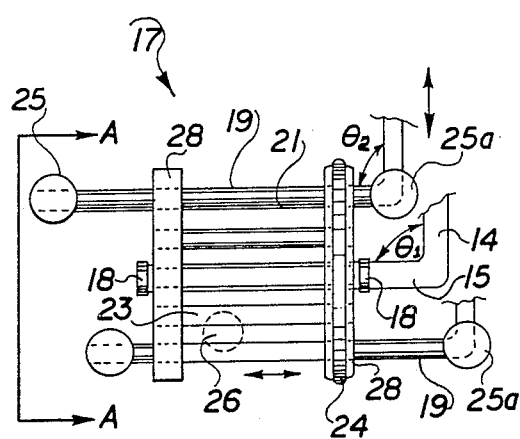
FIG. 2 represents a close-up view of a portion of the invention illustrated in FIG. 1.

The angular axle member 13 preferably comprises a first arm 14 and a second arm 15 connected to the first arm 14. As illustrated in FIG. 2, the first arm 14 and second arm 15 form an angle $\theta_1$ with respect to each other. This angle $\theta_1$ is preferably approximately 90°, although other angles, especially those greater than 90° could also be used with the present invention.

As further illustrated in FIG. 1, the first arm 14 of the angular axle member 13 preferably has a first substantially circular member 16 rotatably fitted thereon. The first substantially circular member 16 is fitted on the first arm 14 such that the first substantially circular member 16 may freely rotate about the first arm 14 in either a clockwise or counterclockwise direction.

As further illustrated in FIG. 1, the angular axle member 13 further preferably includes a second substantially circular member 17 rotatably fitted on the second arm 15. Second substantially circular member 17 is likewise fitted to enable free rotation of the second substantially circular member 17 about the second arm 15 in either a clockwise or counterclockwise direction.

Both the first arm 14 and second arm 15 preferably include a pair of stops 1 which substantially prevent the first and second substantially circular members 16 and 17 from sliding along the first and second arms 14 and 15, respectively, in an axial direction.

As illustrated in FIG. 2, the first and second substantially circular members 16 and 17 are rotatably connected to each other by at least one substantially circular member engaging means 19. The substantially circular member engaging means 19 preferably comprises a first shaft 20 and a second shaft 21 connected to each other at an angle $\theta_2$ substantially corresponding to the angle $\theta_1$ of the angular axle member 13. The substantially circular member engaging means 19 allows the second substantially circular member 17 to drive the first substantially circular member 16 when the push-toy 10 is pushed or pulled across a surface 22 as illustrated in FIG. 4.

As illustrated in FIGS. 1 and 2, the first shaft 20 of the substantially circular member engaging means 19 passes slidably through the first substantially circular member 16 in a direction substantially parallel to the first arm 14 of the angular axle member 13. Likewise, the second shaft 21 of the substantially circular member engaging means 19 passes slidably through the second substantially circular member in a direction substantially parallel to the second arm 15 of the angular axle member 13.

In use, the handle 11 is grasped and the push-toy 10 is pushed or pulled across a surface 22, such as a floor. As illustrated in FIG. 4, the second substantially circular member 17 engages the surface 22 and rotates in the direction of the arrow as shown. This rotation in turn causes the substantially circular member engaging means 19 to experience a bi-directional rotation. This bi-directional rotation is best seen with reference to FIG. 1 and the substantially circular member engaging means 19a and 19b. As the second substantially circular member 17 rotates, the substantially circular member engaging means 19 and particularly the second shaft 21 thereof rotates in a substantially vertical orientation, as represented by arrow A, from a position at the top of the second substantially circular member 17 as represented by substantially circular member engaging means 19a to a position at the bottom of the second substantially circular member 17 as represented by substantially circular member engaging means 19b. This vertical rotation of the second shaft 21 of the substantially circular member engaging means 19 in turn causes a substantially horizontal rotation of the first shaft 20 of the substantially circular member engaging means 19, as represented by arrow B, which in turn forces the first substantially circular member 16 to rotate in a substantially horizontal orientation with respect to the surface 22. As illustrated, the substantially circular members and substantially circular member engaging means are sized so as to permit the first shaft 20 of the substantially circular member engaging means 19 to clear beneath the collar member 27 as the first shaft 20 passes thereunder.

Figure 4:
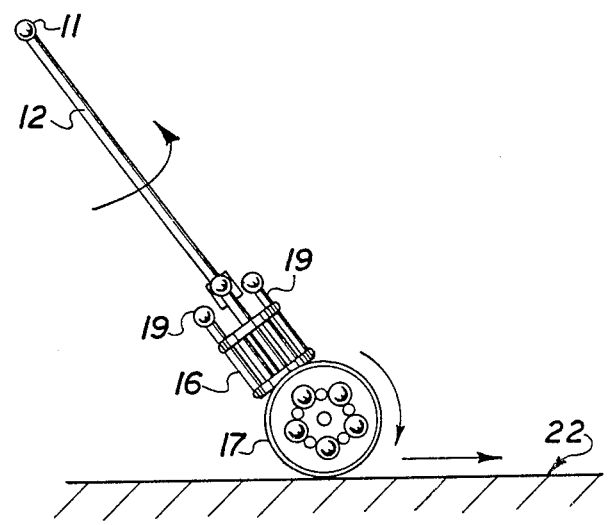
FIG. 4 illustrates the operation of the present invention.

If the push-toy 10 is pulled in the opposite direction across the surface 22 from that shown in FIG. 4, the rotational directions of the first and second substantially circular members 16 and 17 are reversed.

In order that the substantially circular member engaging means 19 is able to drive the first substantially circular member 16, it is preferred that the second arm 15 of the angular axle member 13 be disposed substantially horizontally with respect to the surface 22 and substantially perpendicularly with respect to the main shaft 12.

Figure 3:
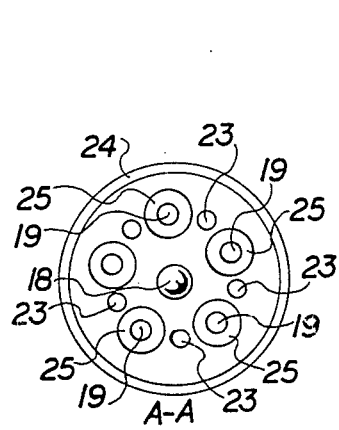
FIG. 3 illustrates a side view of a substantially circular member of the present invention as viewed along A—A of FIG. 2.

As illustrated in FIGS. 2 and 3, the substantially circular members 16 and 17 preferably comprise a pair of round disks 28 connected to and separated from each other by a plurality of spacer means 23. Although round disks are preferred, oblong, elliptical and other substantially circular-shaped disks may be used. The spacer means are preferably a series of cylindrical dowels which pass through each of the disks 28 and are secured thereto.

The second substantially circular member 17, which engages the surface 22, preferably includes at least one friction ring 24 in order to frictionally engage the surface 22 across which the second substantially circular member 17 is driven. Most preferably, a rubber or synthetic rubber ring disposed within a groove in the disk 28 is used for the friction ring 24.

As illustrated in FIG. 1, the push-toy 10 preferably includes a pair of angular axle members 13 attached to the main shaft 12 with a substantially circular member 16 and 17 attached to each angular axle member 13. The angular axle members as shown are attached to the collar member 27 so as to be diametrically opposed to one another.

In a most preferred embodiment of the invention, the push-toy 10 includes a plurality of substantially circular member engaging means 19, as illustrated in FIG. 3. When a plurality of substantially circular member engaging means 19 are used, it is most preferable that the substantially circular member engaging means be arranged circumferentially around the substantially circular member through which they pass. Most preferably the substantially circular member engaging means are equally spaced around the substantially circular member as illustrated in FIG. 3. The circumferential spacing of the first shaft 20 of the substantially circular member engaging means 19 around the first substantially circular member 16 preferably corresponds to the circumferential spacing of the second shaft 21 of the substantially circular member engaging means around the second substantially circular member 17 in order that the second substantially circular member 16 may properly drive the first substantially circular member 17 as described above.

As illustrated in FIGS. 1 and 2, each substantially circular member engaging means 19 preferably includes an end piece 25 at the end of the first shaft 20 distal from the second shaft 21, and an end piece 25 at the end of the second shaft 21 distal from the first shaft 20. These end pieces 25 may be brightly colored to further facilitate user interest. Additionally, the first and second shafts 20 and 21 of the substantially circular member engaging means may be connected by a third end piece 25a as illustrated in FIGS. 1 and 2. Preferably, this connection through third end piece 25a produces a stable joint between the first and second shafts 20 and 21. The end pieces 25 and 25a may be any geometrical shape, although a spherical geometry is preferred. As illustrated in FIG. 2, the shafts 20 and 21 of the substantially circular member engaging means preferably do not pass completely through the end pieces 25 and 25a and are fastened in the interior of end pieces 25 and 25a.

In a preferred embodiment of the invention, the substantially circular members may include a rattle means 26 for producing a rattling sound when the substantially circular members rotate. This rattling means 26 may be any solid object sufficient to product the desired sound, such as a spherical marble or other spherical element. As illustrated, the two round disks 28 as connected by the spacer means 23 and the substantially circular member engaging means 19 house the rattle means 26. The rattle means 26 is sized to be contained by the spacer means 23 and/or the substantially circular member engaging means 19.

The present invention may be constructed of any desirable material. Preferably, the handle, main shaft, collar member, substantially circular members, substantially circular member engaging means and end pieces are fabricated of a hard wood, and the angular axle member and substantially circular member stops are fabricated of plastic, copper or steel tubing.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A push-toy including a handle having a main shaft, said main shaft being connected to an angular axle member, said angular axle member including a first arm rigidly connected to said main shaft, said axle member further including a second arm disposed at an angle with respect to said first arm and being connected thereto, said first arm having a first substantially circular member rotatably fitted thereon such that said first substantially circular member may rotate about said first arm, said second arm having a second substantially circular member rotatably fitted thereon such that said second substantially circular member may rotate about said second arm, said first and second substantially circular members being rotatably engaged with each other by at least one substantially circular member engaging means, said substantially circular member engaging means having a first shaft and a second shaft, said first and second shafts being connected to each other at an angle substantially corresponding to the angle of said angular axle member, said substantially circular member engaging means first shaft passing slidably through said first substantially circular member in a direction substantially parallel to said first arm of said angular axle member, said substantially circular member engaging means second shaft passing slidably through said second substantially circular member in a direction substantially parallel to said second arm of said angular axle member.

2. The push-toy of claim 1 wherein said angle of said angular axle member is about 90° and said first arm of said angular axle member is substantially parallel to said main shaft.

3. The push-toy of claim 1 wherein said second arm of said angular axle member is disposed substantially perpendicularly with respect to said main shaft so as to be substantially parallel to a surface across which said push-toy is driven.

4. The push-toy of claim 1 wherein said first and second arms each include a pair of stops, said stops substantially preventing said first and second substantially circular members from sliding along said first and second arms, respectively, in an axial direction.

5. The push-toy of claim 1 wherein said first and second substantially circular members each comprise two substantially round discs connected to and separated from each other by a plurality of spacer means.

6. The push-toy of claim 1 wherein said second substantially circular member includes a friction ring for enabling said second substantially circular member to frictionally engage a surface across which said second substantially circular member is driven.

7. The push-toy of claim 1 further including a second angular axle member attached to said main shaft and diameterically opposed said first angular axle member, said second angular axle member including first and second arms, and first and second substantially circular members, and substantially circular member engaging means, all arranged substantially as claimed in claim 1.

8. The push-toy of claim 1 including a plurality of said substantially circular member engaging means, the first shaft of each said substantially circular member engaging means being spaced circumferentially about said first substantially circular member, the second shaft of each substantially circular member engaging means being spaced circumferentially about said second substantially circular member.

9. The push-toy of claim 8 wherein each said first shaft of said substantially circular member engaging means is spaced circumferentially equidistant about said first substantially circular member and each said second shaft of said substantially circular member engaging means is spaced circumferentially equidistant about said second substantially circular member.

10. The push-toy of claim 1 wherein said substantially circular member engaging means first shaft includes an end piece at the end of said first shaft distal from said second shaft, and said substantially circular member engaging means second shaft includes an end piece at the end of said second shaft distal from said first shaft.

11. The push-toy of claim 5 wherein said spacer means and said two substantially round discs of said first and second substantially circular members house a rattle means for producing a rattling sound when said substantially circular members rotate.

12. The push-toy of claim 11 wherein said rattle means comprises a spherical element sized to be contained by said spacer means and said substantially round discs of said substantially circular members.

13. The push-toy of claim 7 wherein said first and second angular axle members are attached to said main shaft by a collar member.

* * * * *